(12) United States Patent
Wilson

(10) Patent No.: US 6,401,258 B1
(45) Date of Patent: Jun. 11, 2002

(54) HEADGEAR FOR SPORTS FANS

(76) Inventor: Corey Wilson, 1927 W. Hampton Ave., Milwaukee, WI (US) 53209

( * ) Notice: Subject to any disclaimer, the term of this patent is extended or adjusted under 35 U.S.C. 154(b) by 6 days.

(21) Appl. No.: 09/696,520

(22) Filed: Oct. 25, 2000

Related U.S. Application Data

(60) Provisional application No. 60/163,509, filed on Nov. 4, 1999.

(51) Int. Cl.⁷ .................................................. A42B 1/06
(52) U.S. Cl. .................................. 2/410; 2/411; 2/425
(58) Field of Search ............................. 2/410, 411, 412, 2/421, 424, 200.1, 171, 206, 425, 414

(56) References Cited

U.S. PATENT DOCUMENTS

| | | | |
|---|---|---|---|
| 1,080,690 A | * | 12/1913 | Hipkiss |
| 2,140,716 A | * | 12/1938 | Pryale ............................ 2/414 |
| 3,242,500 A | * | 3/1966 | Derr |
| 3,274,612 A | * | 9/1966 | Merriam |
| 3,594,815 A | * | 7/1971 | Reese |
| 3,725,956 A | * | 4/1973 | Reisen |
| 5,343,569 A | * | 9/1994 | Asare et al. |
| 5,437,064 A | * | 8/1995 | Hamaguchi |
| 5,713,082 A | * | 2/1998 | Bassette et al. |
| 5,950,244 A | * | 9/1999 | Fournier et al. |

FOREIGN PATENT DOCUMENTS

| | | | | |
|---|---|---|---|---|
| CA | 1160414 | * | 1/1984 | ..................... 2/411 |
| JP | 1207612 | * | 9/1986 | ..................... 2/424 |
| JP | 405132809 | * | 5/1993 | ..................... 2/421 |

* cited by examiner

*Primary Examiner*—Rodney M. Lindsey
(74) *Attorney, Agent, or Firm*—Ryan Kromholz & Manion, S.C.

(57) ABSTRACT

A novel headgear is formed of a resilient elastomeric foam core having adhered thereover an exterior fabric shell, forming a composite material substantially in the shape of a football helmet. The interior foam may be cured in place within said fabric whereby said foam is self adhered to the interior of said fabric, or, alternatively, the fabric may be adhered to the exterior of said foam by means of an adhesive. The invention also provides process for forming headgear which includes providing a two-part mold including a first part containing a mold cavity, placing a fabric layer in the cavity, inserting the second mold part in said cavity, which second part has an opening for injection into the mold of a plastic foam forming material. The foam-former is injected through the opening and cured in situ in contact with the fabric thereby forming a composite.

1 Claim, 2 Drawing Sheets

HEADGEAR FOR SPORTS FANS

This application claims benefit of provisional application Ser. No. 60/163,509 filed Nov. 4, 1999.

The present invention relates to headgear. More specifically the invention relates to novelty headgear for sports fans.

BACKGROUND OF THE INVENTION

Fans at sporting events often use various articles and forms of clothing for demonstrating their support for a particular sports team. Such headgear can consist of shirts, caps, jackets, and various novelty items such as plastic tomahawks or novelty headgear such as "cheese hats" formed out of a yellow foam material typically associated with fans supporting athletic teams based in Wisconsin.

SUMMARY OF THE INVENTION

The present invention relates to novel headgear which can be customized to be suitable for fans supporting a wide variety of football teams or other athletic teams.

In accordance with the invention novel headgear is provided in a shape resembling a football helmet. In accordance with an important aspect of the invention the outer surface of the helmet is formed from a fabric which can be provided in a variety of colors and color combinations. The helmets may also be made to bear designs such as team emblems or logos, for example, by using decals or by printing the same on the exterior of the fabric.

In accordance with a further aspect of the invention the interior of the helmet which is adapted for contact with the wearer'head is formed of a foam rubber material. In accordance with a further related aspect the foam material can be either adhered to the fabric covering or foamed in situ therein.

A warm fabric such as a fleece material can be used as an inner liner for adding warmth to the headgear, if intended for outdoor use in a cold climate. A known warmth-providing head covering, such as a knit cap or a woolen or fleece cap, may be modified for mounting in the interior of the helmet, thereby providing the novelty helmet wearer with warmth, especially desirable in cold weather during late season games or winter playoffs. In another embodiment of the present invention, a mouth covering, or a face and mouth covering, may be supplied to resemble a chin-strap of a football helmet. This mouth or face and mouth covering can be constructed of known material, such as neoprene or a fabric, and can be made to resemble a chin-strap on a football helmet. This embodiment provides the wearer with further warmth, and further aesthetic novelty. A face mask structure may also be added to provide further resemblance to an actual player helmet worn by the athletes.

In accordance with further related aspects of the invention, novel methods for forming the headwear of this invention are provided. In accordance with one such process, a mold cavity is provided within which the fabric shell is supported and foam forming fluid plastic or rubber material is injected therein and cured in place in contact with the fabric covering to thereby form a unitary final product. The foam can also be dipped in a film-forming material to provide a closed-cell appearance on the exterior of the foam.

In accordance with a preferred method of forming the helmets of the present invention an elastomeric foam interior can be formed separately. Subsequently a fabric layer can be adhered over the elastomeric foam material and adhered thereto by means of a suitable adhesive. Also, just as in the case of the foamed in place process the components can be adhered together while being supported within a supportive mold structure. The preferred fabric is of a type which will conform to the exterior shape of the headgear.

Briefly, the invention provides novel headgear which is formed of a resilient elastomeric foam core having adhered thereover an exterior fabric shell, forming a composite material substantially in the shape of a football helmet. The interior foam may be cured in place within said fabric whereby said foam is self adhered to the interior of said fabric, or, alternatively, the fabric may be adhered to the exterior of said foam by means of an adhesive. The invention also provides process for forming headgear which includes providing a two-part mold including a first part containing a mold cavity, placing a fabric layer in the cavity, inserting the second mold part in said cavity, which second part has an opening for injection into the mold of a plastic foam forming material. The foam-former is injected through the opening and cured in situ in contact with the fabric thereby forming a composite.

Further aspects and objectives of the invention will be apparent from the claims, the following detailed description and the drawings.

DETAILED DESCRIPTION OF THE INVENTION

Figure 1:
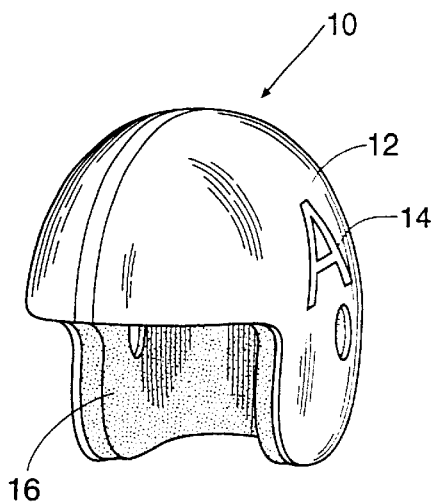
FIG. 1 is a perspective view of a helmet of this invention.
Figure 3:
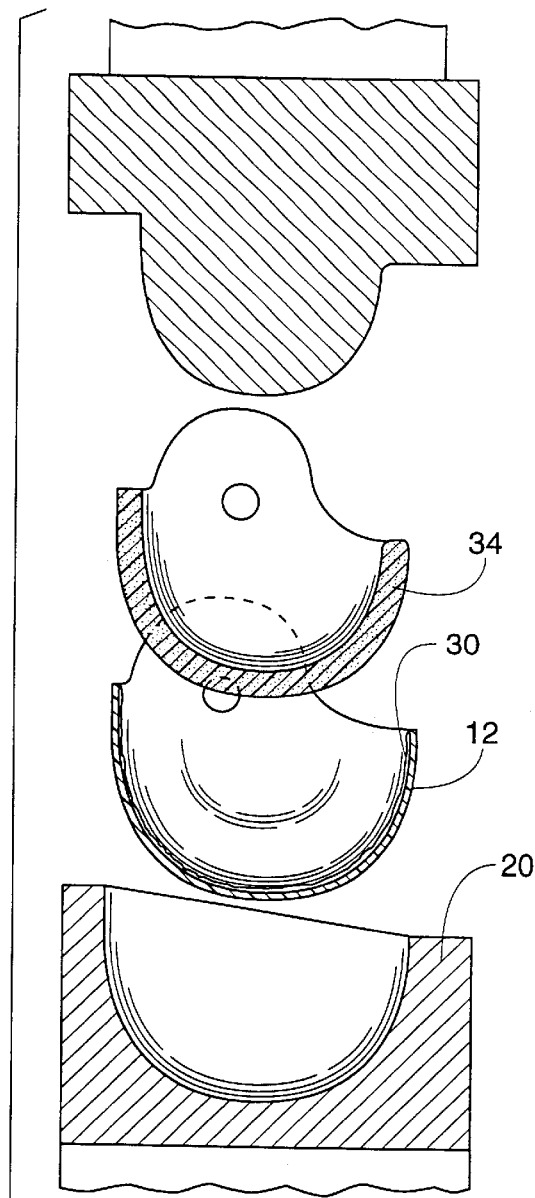
FIG. 3 is a central sectional view showing an alternative method of forming helmets according to the invention; and, FIG. 4 is a perspective view of another helmet of this invention which incorporates a face guard.

Referring more particularly to the drawings, there is seen a helmet headwear 10 of this invention. Helmet 10 is formed from an outer fabric layer 12 upon which various colors and logos 14 are printed, painted or applied by means of decals. The interior of helmet 10 is formed of a foam material 16.

Figure 2:
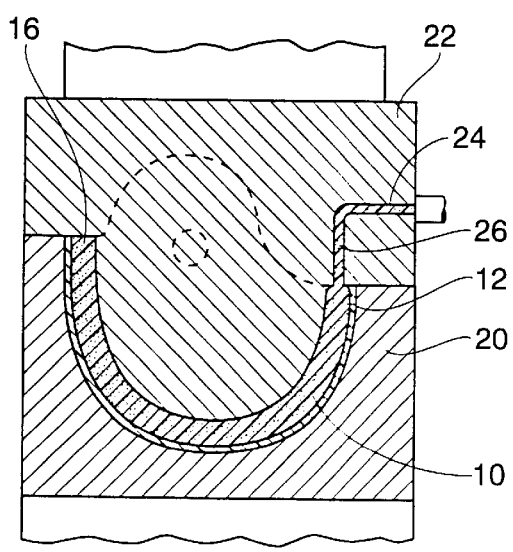
FIG. 2 is a central cross sectional view showing molding of a helmet of this invention.

Referring to FIG. 2 there is seen, in diagrammatic form, a process of forming helmets 10 of this invention. In this case a two piece mold consisting of a supportive bottom mold component 20 and a mold insert 22 are provided. Mold insert 22 contains a passageway 24 for supplying liquid foam-forming material 26 into the interior of the mold cavity formed between the mold bottom 20 and the mold insert 22. Also, as seen in the drawings, the fabric layer 12 can be inserted into the cavity of bottom mold structure 20 and supported therein. The mold insert is then placed over the cavity 20 to form a closed mold structure. Subsequently the liquid foam-forming material 26 is injected into the mold cavity. Subsequent to curing of the liquid foam material, the composite helmet 10 resulting from this procedure is removed from the mold. The composite structure 10 is thus substantially complete.

In the alternative method, referred to above, helmet 10 can be formed by first forming a foam interior structure 34. Then, the fabric 12 can be supported in a mold bottom 20. In this case the adhesive 30 can be applied either over the exterior of the foam insert 14 or on the interior of the fabric 12, or if desired, both. The adhesive 30 may be applied by brushing, spraying, etc.

Fabric 12 can be any suitable fabric material such as an elastic material such as that sold under the trade name Spandex®, which is preferred. Alternatively, other synthetic or natural fibers such as cotton or wool, or synthetic fibers such as Dacron, acrylates, rayon, polyester, etc. can be used. The foam forming material can be a synthetic polymeric elastomer such as a polyurethane. However, any synthetic or natural rubber foam-forming composition can be utilized in the practice of the invention. In order to facilitate conforming of the fabric 12 to the outside of the foam, an easily deformable fabric such as a single-knit material is preferred.

In an alternative embodiment, a layer of a known warmth-providing head covering material, such as a knitted wool or other fibrous material or a soft material such as fleece, may be attached to the interior 16 of the helmet 10, providing the novelty helmet wearer with warmth, especially desirable in cold weather climates. Preferably the interior fabric is adhered or cemented in place.

Also a mouth covering, or a face and mouth covering, may be provided to resemble a chin-strap of a football helmet. This mouth or face and mouth covering can be constructed of known material, such as neoprene, and can be made to resemble a chin-strap on a football helmet. The mouth covering, or a face and mouth covering, can be coupled with the helmet by any number of known methods, including for example buttons, pins, adhesives, stitches, hook and loop fasteners such as Velco®, etc. This embodiment provides the wearer with further warmth, and further aesthetic novelty.

Figure 4:
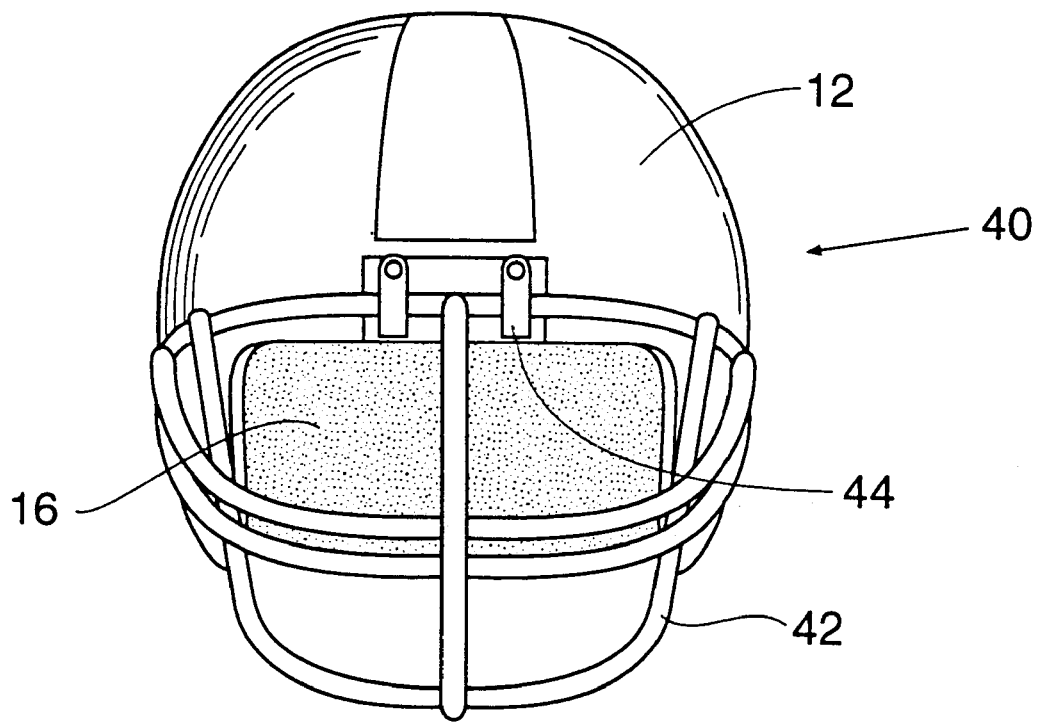

In the alternative embodiment of FIG. 4, another helmet 40 of this invention is illustrated. Helmet 40 also has a fabric outer surface 12 which also is decorated with appropriate selected team colors and logos. Helmet 40 is provided with a faceguard 42 removably mounted thereto as shown. Faceguard 42 may be formed of a plastic material having appropriate resilience and rigidity to be shape stable. Suitable loops 44 provided with snap fasteners or Velcro ® can be used for mounting the faceguard 42 to the helmet 40.

Various other modifications and adaptations of the invention will readily be apparent to those skilled in the art.

What is claimed is:

1. A novelty headgear formed of a resilient elastomeric foam core having an exposed inner surface adapted for direct contact with a wearer's head and having adhered thereover an exterior shell of elastic fabric, forming a composite material substantially in the shape of the football helmet said foam core being cast and cured in situ within said fabric whereby said foam is self-adhered to said elastic fabric.

\* \* \* \* \*